United States Patent
Lim

(10) Patent No.: US 12,269,341 B2
(45) Date of Patent: Apr. 8, 2025

(54) SYSTEM AND METHOD FOR CONTROLLING VEHICLE

(71) Applicants: Hyundai Motor Company, Seoul (KR); Kia Corporation, Seoul (KR)

(72) Inventor: Jae Wan Lim, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 352 days.

(21) Appl. No.: 17/893,429

(22) Filed: Aug. 23, 2022

(65) Prior Publication Data

US 2023/0191908 A1 Jun. 22, 2023

(30) Foreign Application Priority Data

Dec. 22, 2021 (KR) .................. 10-2021-0185161

(51) Int. Cl.
*G06T 7/00* (2017.01)
*B60K 35/00* (2006.01)
*B60K 35/65* (2024.01)
*B60K 35/80* (2024.01)
*B60K 35/85* (2024.01)

(52) U.S. Cl.
CPC .............. *B60K 35/00* (2013.01); *B60K 35/65* (2024.01); *B60K 35/80* (2024.01); *B60K 35/85* (2024.01); *B60K 2360/563* (2024.01); *B60K 2360/5911* (2024.01); *B60K 2360/731* (2024.01); *B60K 2360/741* (2024.01)

(58) Field of Classification Search
CPC .............. B60K 35/00; B60K 2370/563; B60K 2370/5911; B60K 2370/731; B60K 2370/741; B60K 2360/16; B60K 2360/166; B60K 2360/167; B60K 2360/171
See application file for complete search history.

(56) References Cited

U.S. PATENT DOCUMENTS

| | | | |
|---|---|---|---|
| 10,163,018 B1* | 12/2018 | Chan | G06Q 40/08 |
| 11,887,562 B2* | 1/2024 | Edgren | H04N 23/54 |
| 2017/0364148 A1* | 12/2017 | Kim | G06F 3/04842 |
| 2019/0355178 A1* | 11/2019 | Hermina Martinez | G06V 20/593 |
| 2020/0065042 A1* | 2/2020 | Lim | B60K 35/235 |
| 2021/0182609 A1* | 6/2021 | Arar | G06V 20/597 |

FOREIGN PATENT DOCUMENTS

| KR | 10-2014-0079235 A | 6/2014 |
|---|---|---|
| KR | 10-1986156 B1 | 6/2019 |

* cited by examiner

*Primary Examiner* — Dalena Tran
(74) *Attorney, Agent, or Firm* — Fox Rothschild LLP

(57) ABSTRACT

Disclosed are a system and method for controlling a vehicle. The system for controlling a vehicle includes a vehicle control device that collects vehicle information and driver information, and a server that determines a streaming cluster image corresponding to the vehicle information and the driver information based on a learned cluster image.

18 Claims, 13 Drawing Sheets

SYSTEM AND METHOD FOR CONTROLLING VEHICLE

CROSS-REFERENCE TO RELATED APPLICATION

This application is based on and claims under 35 U.S.C. § 119 (a) the benefit of priority to Korean Patent Application No. 10-2021-0185161, filed in the Korean Intellectual Property Office on Dec. 22, 2021, the entire contents of which are incorporated herein by reference.

TECHNICAL FIELD

Embodiments of the present disclosure relate to a system and method for controlling a vehicle.

DESCRIPTION OF RELATED ART

Recently, there is a trend in which a digital cluster that provides various contents as well as vehicle information by applying a digital display is mounted on a vehicle. In the digital cluster, the color or shape of the gauge of the cluster may dynamically change according to the driving environment, and the driving information of the vehicle may be displayed graphically so that the user intuitively recognizes it.

However, a high-performance processor is applied to the digital cluster to provide contents of various designs, thereby increasing the vehicle manufacturing cost. Because a vehicle spends more time parked than driving, the application of a digital high-performance processor to a vehicle for a digital cluster that operates only when driving causes unnecessary cost increase. Accordingly, there is a need to develop a technology capable of operating a digital cluster while saving resources of a vehicle control system to enable high-definition image output at low cost.

SUMMARY

Embodiments of the present disclosure have been made to solve the above-mentioned problems occurring in the prior art while advantages achieved by the prior art are maintained intact.

An exemplary embodiment of the present disclosure provides a vehicle control system and method capable of outputting high-definition images through a digital cluster at low cost by saving resources.

The technical problems to be solved by embodiments of the present disclosure are not limited to the aforementioned problems, and any other technical problems not mentioned herein will be clearly understood from the following description by those skilled in the art to which embodiments of the present disclosure pertain.

According to an exemplary embodiment of the present disclosure, a system for controlling a vehicle includes a vehicle control device that collects vehicle information and driver information, and a server that determines a streaming cluster image corresponding to the vehicle information and the driver information based on a learned cluster image.

The server may generate the learned cluster image by learning based on a cluster image selected by a driver from cluster images previously transmitted to the vehicle control device, previously received vehicle information, and previously received driver information.

The server may determine the streaming cluster image as the learned cluster image when it is possible to determine the streaming cluster image corresponding to the vehicle information and the driver information based on the learned cluster image.

The server may generate at least one image based on the vehicle information and the driver information and determine the streaming cluster image as one of the at least one image when it is impossible to determine the streaming cluster image corresponding to the vehicle information and the driver information based on the learned cluster image.

The vehicle control device may determine whether a smart device capable of communicating with the server exists around a host vehicle when the streaming cluster image is not received due to a communication failure with the server and receive the streaming cluster image from the smart device when the smart device exists around the host vehicle and is capable of receiving the streaming cluster image from the server.

The vehicle control device may receive the streaming cluster image through short-range communication from the smart device and output the streaming cluster image to a cluster.

The vehicle control device may determine whether another vehicle of the same type as the host vehicle exists around the host vehicle when the smart device does not exist, and receive the streaming cluster image through the other vehicle when the other vehicle exists and is capable of receiving the streaming cluster image from the server.

The vehicle control device may determine whether the communication failure with the server is temporary when the other vehicle does not exist and request the server to transmit the streaming cluster image having a resolution less than a reference resolution when the communication failure is temporary.

The vehicle control device may output a cluster image pre-stored in the vehicle when the communication failure is not temporary.

The vehicle control device may include a communication device that receives the streaming cluster image, and a display device that streams the received streaming cluster image in real time or outputs a pre-stored cluster image.

According to an exemplary embodiment of the present disclosure, a method of controlling a vehicle includes collecting, by a vehicle control device, vehicle information and driver information, and determining, by a server, a streaming cluster image corresponding to the vehicle information and the driver information based on a learned cluster image.

The server may generate the learned cluster image by learning based on a cluster image selected by a driver from cluster images previously transmitted to the vehicle control device, previously received vehicle information, and previously received driver information.

The server may determine the streaming cluster image as the learned cluster image when it is possible to determine the streaming cluster image corresponding to the vehicle information and the driver information based on the learned cluster image.

The server may generate at least one image based on the vehicle information and the driver information and determine the streaming cluster image as one of the at least one image when it is impossible to determine the streaming cluster image corresponding to the vehicle information and the driver information based on the learned cluster image.

The vehicle control device may determine whether a smart device capable of communicating with the server exists around a host vehicle when the streaming cluster image is not received due to a communication failure with the server and receive the streaming cluster image from the smart device when the smart device exists around the host vehicle and is capable of receiving the streaming cluster image from the server.

The vehicle control device may receive the streaming cluster image through short-range communication from the smart device and output the streaming cluster image to a cluster.

The vehicle control device may determine whether another vehicle of the same type as the host vehicle exists around the host vehicle when the smart device does not exist and receive the streaming cluster image through the other vehicle when the other vehicle exists and is capable of receiving the streaming cluster image from the server.

The vehicle control device may determine whether the communication failure with the server is temporary when another vehicle does not exist and request the server to transmit the streaming cluster image having a resolution less than a reference resolution when the communication failure is temporary.

The vehicle control device may output a cluster image pre-stored in the vehicle when the communication failure is not temporary.

The vehicle control device may include a communication device that receives the streaming cluster image, and a display device that streams the received streaming cluster image in real time or output a pre-stored cluster image.

As discussed, the method and system suitably include use of a controller or processer.

In another aspect, vehicles are provided that comprise an apparatus as disclosed herein.

BRIEF DESCRIPTION OF THE DRAWINGS

The above and other objects, features and advantages of embodiments of the present disclosure will be more apparent from the following detailed description taken in conjunction with the accompanying drawings.

DETAILED DESCRIPTION

Figure 1:
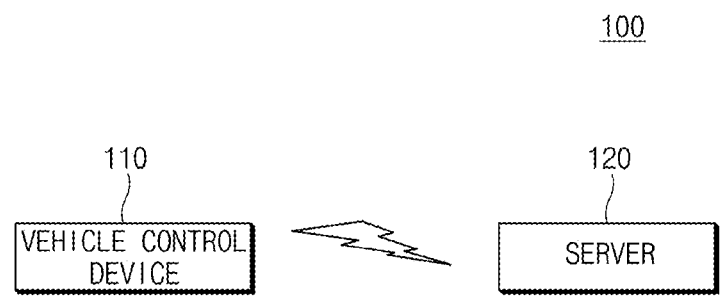
FIG. 1 is a diagram illustrating the configuration of a system for controlling a vehicle according to an exemplary embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings.

Further, in describing the embodiment of the present disclosure, a detailed description of the related known configuration or function will be omitted when it is determined that it interferes with the understanding of the embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating the configuration of a system for controlling a vehicle according to an exemplary embodiment of the present disclosure.

As illustrated in FIG. 1, a system 100 for controlling a vehicle may include a vehicle control device 110 and a server 120.

The vehicle control device 110 may collect vehicle information and driver information, and the server 120 may determine a streaming cluster image corresponding to the vehicle information and driver information based on a learned cluster image. Hereinafter, the description of the vehicle control device 110 will be detailed with reference to FIG. 2, and the description of the server 120 will be detailed with reference to FIG. 3.

Figure 2:
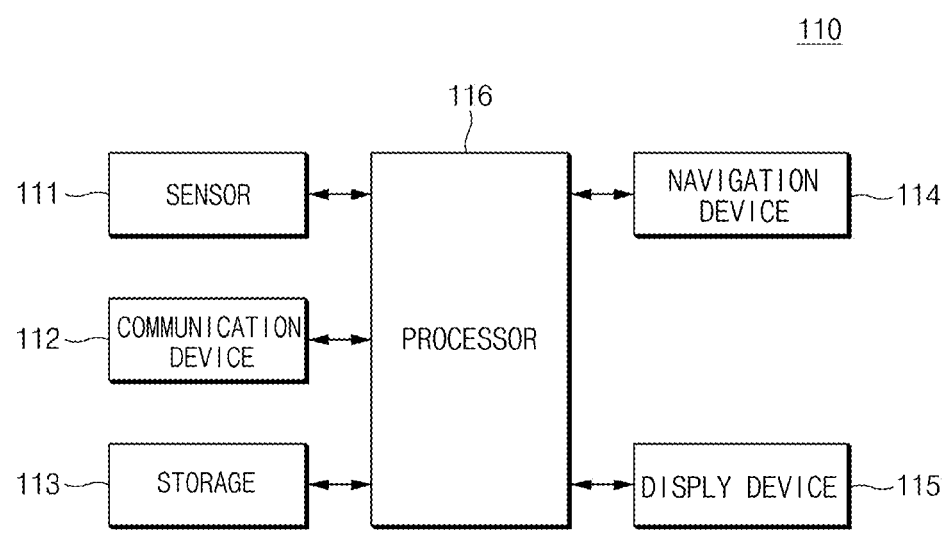
FIG. 2 is a diagram illustrating the configuration of a vehicle control device according to an exemplary embodiment of the present disclosure.
Figure 3:
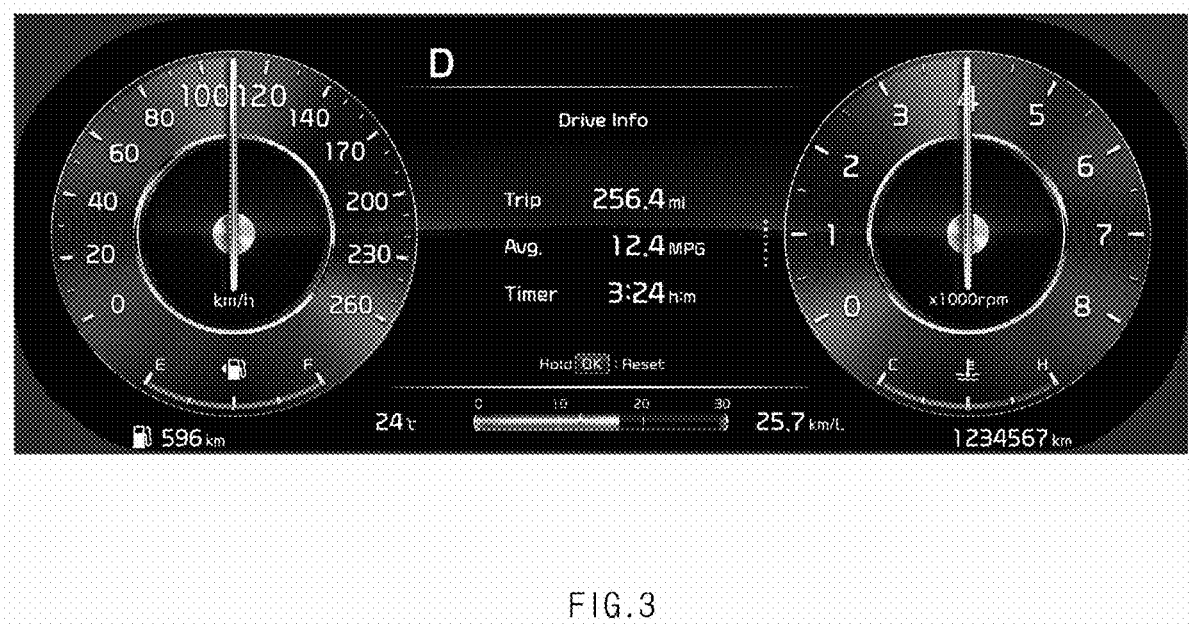
FIGS. 3 and 4 are views showing cluster images output according to an exemplary embodiment of the present disclosure.
Figure 4:
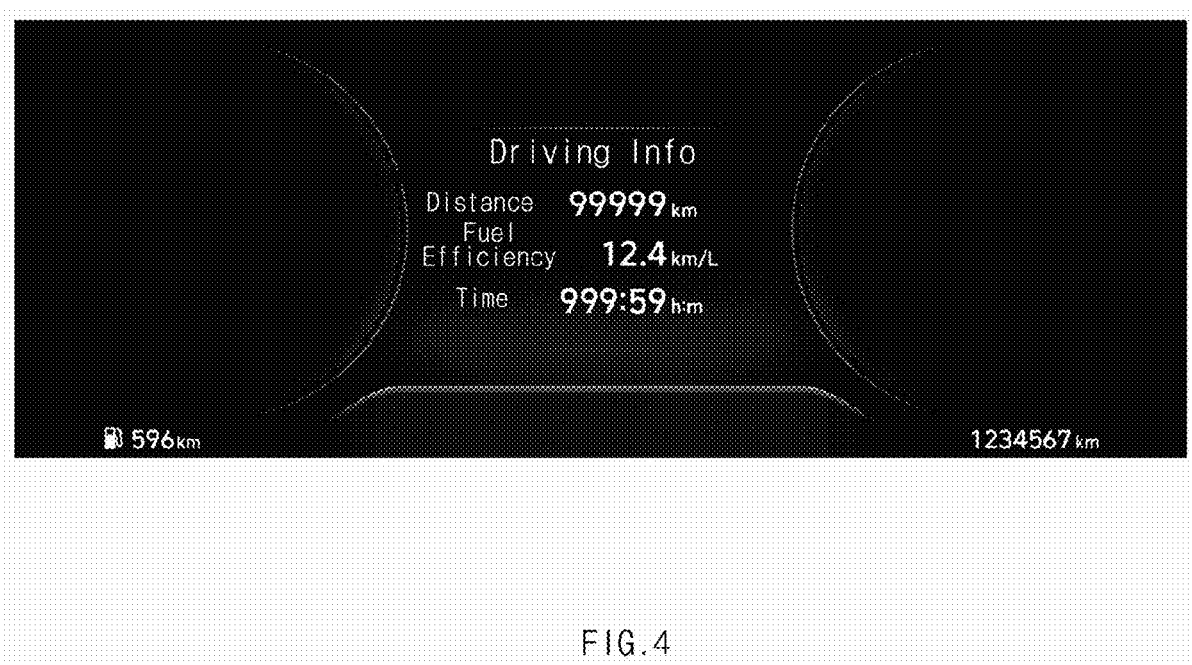

FIG. 2 is a diagram illustrating the configuration of a vehicle control device according to an exemplary embodiment of the present disclosure. FIGS. 3 and 4 are views showing cluster images output according to an exemplary embodiment of the present disclosure.

As shown in FIG. 2, the vehicle control device 110 may include a sensor 111, a communication device 112, storage 113, a navigation device 114, a display device 115, and a processor 116.

The sensor 111 may acquire a driver image and vehicle information. According to an exemplary embodiment, the sensor 111 may include an image sensor that acquires the driver image. The processor 116 may determine the driver's age based on the driver image and collect driver information including the driver's age. In addition, the sensor 111 may sense various situations of the vehicle. To this end, the sensor 111 may include a wheel sensor, a speed sensor, an inclination sensor, a weight sensor, a heading sensor, a yaw sensor, a gyro sensor, a position module, a vehicle forward/reverse sensor, a battery sensor, a fuel sensor, a tire sensor, a vehicle interior temperature sensor, a vehicle interior humidity sensor, an ultrasonic sensor, an illuminance sensor, a radar, a lidar, and the like.

The communication device 112 may wirelessly communicate with the server 120, other vehicles, smart devices, and the like. According to an exemplary embodiment of the present disclosure, the communication device 112 may communicate with the server 120 in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

In addition, the communication device 112 may communicate with other vehicles and smart devices in short range. The short range communication may include Bluetooth communication. According to an exemplary embodiment of the present disclosure, the communication device 112 may communicate with another vehicle in V2V and may communicate with a smart device in V2X.

The storage 113 may store at least one cluster image to be output through the display device 115. In this case, the cluster image may include an image having a lower resolution than a reference resolution. The storage 113 may store at least one algorithm for performing operations or executions of various commands for the operation of the vehicle control device 110 according to an exemplary embodiment of the present disclosure. The storage 113 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The navigation device 114 may include a GPS receiver to receive the current location of the vehicle and may provide map image information, road guidance image information, road guidance voice information, destination information, and the like in a specified area based on the current location of the vehicle.

The display device 115 may stream the streaming cluster image received through the communication device 112 in real time or output a pre-stored cluster image. According to an exemplary embodiment of the present disclosure, the display device 115 may include a cluster.

The processor 116 may be implemented with various processing devices such as a microprocessor and the like in which a semiconductor chip capable of performing operations or executions of various commands is built-in and may control operations of the vehicle control device 110 according to an exemplary embodiment of the present disclosure.

The processor 116 may transmit the vehicle information and driver information including the location of the vehicle through the sensor 111 and the navigation device 114 to the server 120 and stream the received streaming cluster image in real time or output the stored cluster image.

The processor 116 may determine whether to receive the streaming cluster image from the server 120. When it is determined that the streaming cluster image can be received from the server 120, as shown in FIG. 3, the processor 116 may receive a high-quality cluster image.

Meanwhile, when the processor 116 cannot receive the streaming cluster image from the server 120 due to a communication failure, it can be determined whether there is a smart device capable of communicating with the server 120 in the vicinity of the host vehicle. In this case, the smart device may communicate with the communication device 112 through Bluetooth, and according to an exemplary embodiment, may include a smart phone, a smart pad, a laptop computer, and the like.

When it is determined that there is a smart device capable of communicating with the server 120 around a host vehicle, the processor 116 may request the smart device to transmit the streaming cluster image. When the smart device can receive the streaming cluster image from the server 120, the processor 116 may receive the streaming cluster image from the smart device.

Meanwhile, when it is determined that there is no smart device capable of communicating with the server 120 around the host vehicle, the processor 116 may determine whether another vehicle of the same type as the host vehicle exists around the host vehicle.

When it is determined that there is another vehicle of the same type as the host vehicle around the host vehicle, the processor 116 may request the other vehicle to transmit the streaming cluster image. When the other vehicle can receive the streaming cluster image from the server 120, the processor 116 may receive the streaming cluster image through the other vehicle.

Meanwhile, when it is determined that there is no other vehicle of the same type as the host vehicle around the host vehicle, the processor 116 may determine whether the communication failure with the server 120 is temporary.

When it is determined that the communication failure with the server 120 is temporary, the processor 116 may request the server 120 to transmit a streaming cluster image having a resolution less than a reference resolution.

Meanwhile, when the communication failure with the server 120 is not temporary, the processor 116 may output a cluster image pre-stored in the vehicle. As shown in FIG. 4, the cluster image pre-stored in the vehicle according to an exemplary embodiment of the present disclosure may include an image in which only data is marked on a black background screen.

Figure 5:
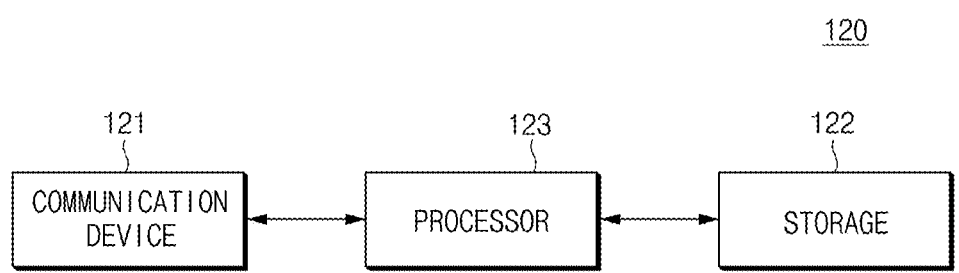
FIG. 5 is a diagram illustrating the configuration of a server according to an exemplary embodiment of the present disclosure.
Figure 6:
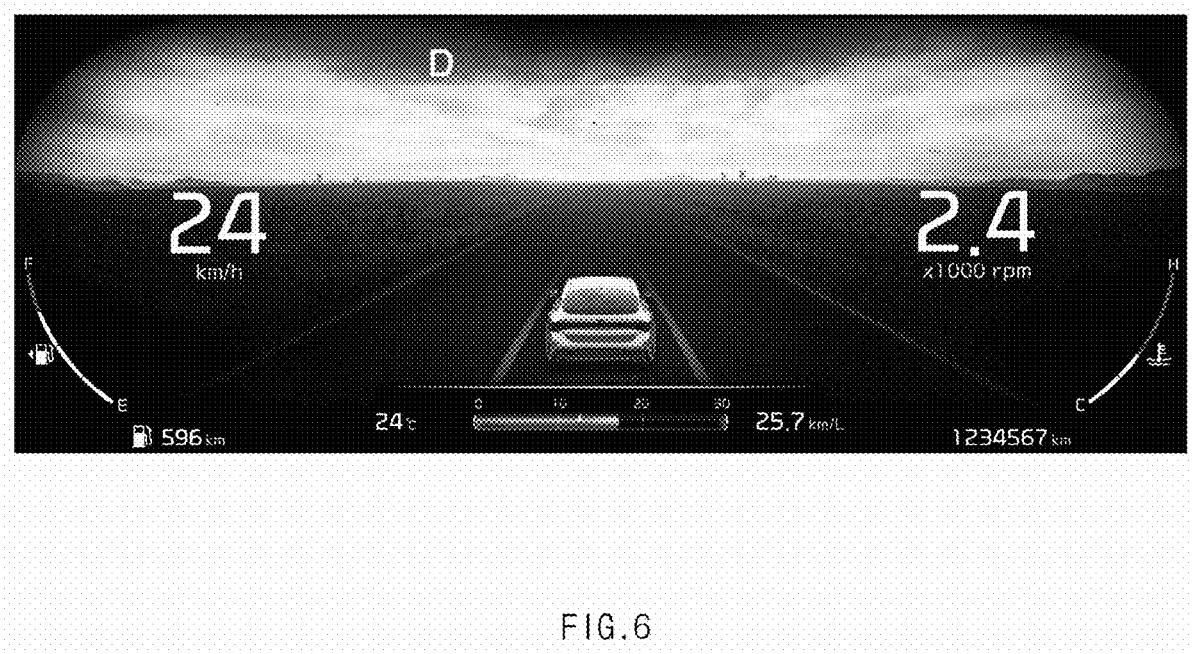
FIGS. 6 to 9 are views illustrating cluster images determined by a server according to an exemplary embodiment of the present disclosure.
Figure 7:
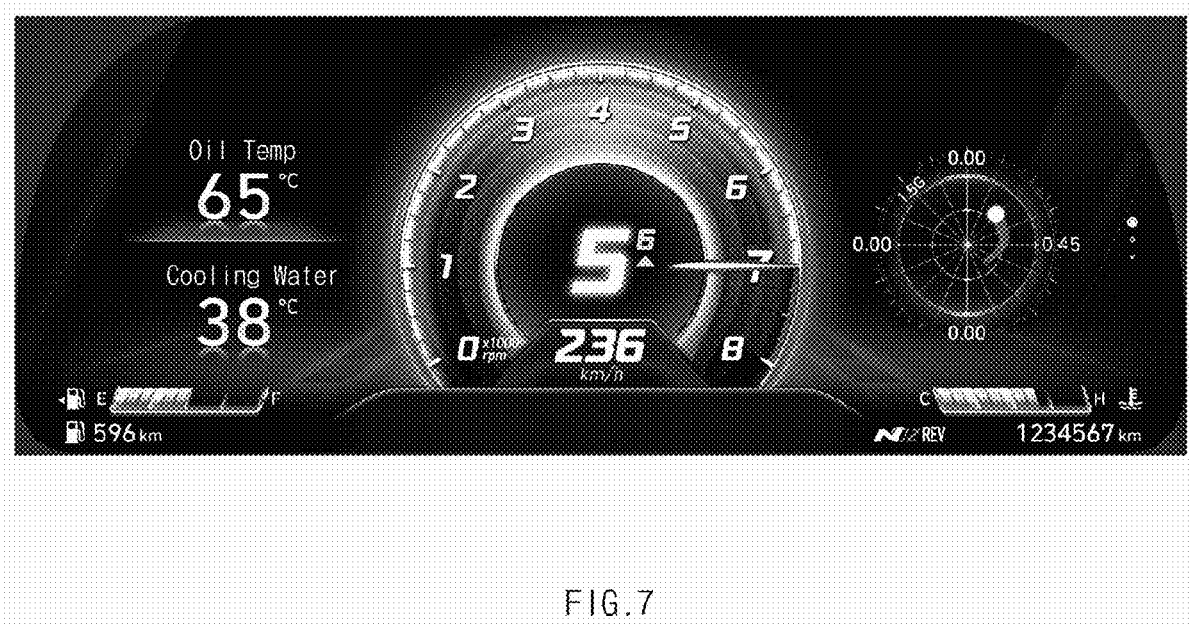
Figure 8:
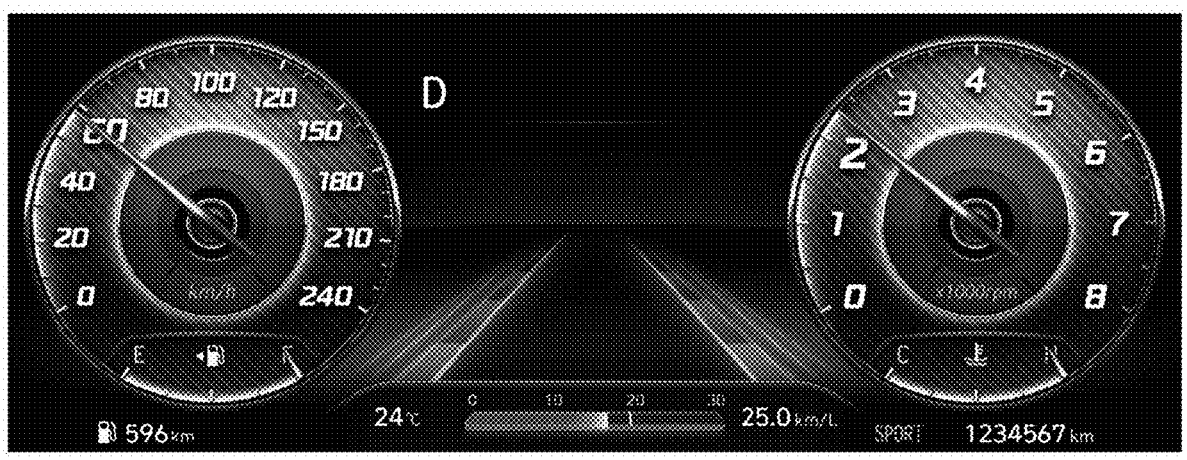
Figure 9:
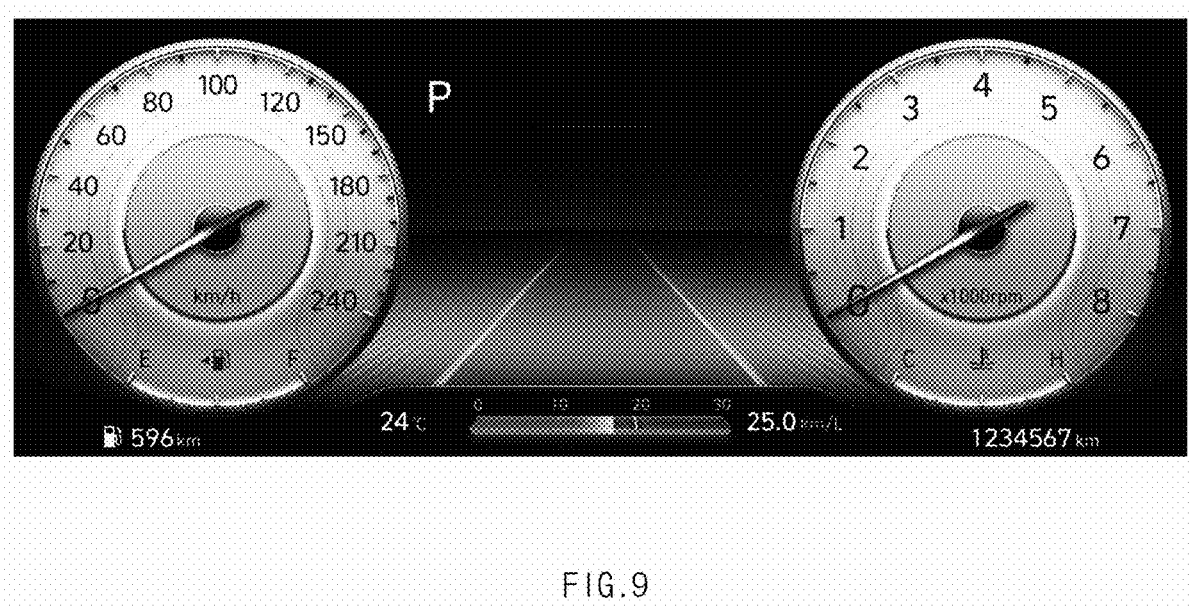

FIG. 5 is a diagram illustrating the configuration of a server according to an exemplary embodiment of the present disclosure. FIGS. 6 to 9 are views illustrating cluster images determined by a server according to an exemplary embodiment of the present disclosure.

As shown in FIG. 5, the server 120 may include a communication device 121, storage 122, and a processor 123.

The communication device 121 may wirelessly communicate with the vehicle control device 110, another vehicle, a smart device, and the like. According to an exemplary embodiment of the present disclosure, the communication device 121 may communicate with the server 120 in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

The storage 122 may store at least one algorithm for performing operations or executions of various commands for the operation of the server 120 according to an exemplary embodiment of the present disclosure. The storage 122 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The processor 123 may be implemented with various processing devices such as a microprocessor and the like in which a semiconductor chip capable of performing operations or executions of various commands is built-in and may control operations of the server 120 according to an exemplary embodiment of the present disclosure.

The processor 123 may receive vehicle information and driver information to learn the cluster image corresponding to the vehicle information and driver information and collect vehicle information for learning and driver information for learning. According to an exemplary embodiment, the vehicle information may include a vehicle location, a speed, and processor performance of a vehicle control device. In addition, the driver information may include driver age information.

First, the processor 123 may generate a cluster image based on vehicle information and driver information (vehicle information for learning and driver information for learning) and transmit the generated cluster image to the vehicle control device 110. The processor 123 may receive the cluster image selected by the driver from the cluster images transmitted to the vehicle control device 110 and learn based on the cluster image selected by the driver, the collected vehicle information and driver information to generate a learned cluster image. Because the learned cluster image is learned corresponding to previously received vehicle information and previously received driver information (vehicle information for learning and driver information for learning), the learned cluster image may be customized corresponding to the vehicle state and the driver state.

The processor 123 may determine whether the streaming cluster image corresponding to the vehicle information (current vehicle information) and the driver information (current driver information) received from the vehicle control device 110 can be determined. That is, the processor 123 may determine whether there is a cluster image learned corresponding to the information received from the vehicle control device 110.

When there is a cluster image learned corresponding to the information received from the vehicle control device, the processor 123 may determine that it is possible to determine a streaming cluster image corresponding to the information received from the vehicle control device 110 and may determine the streaming cluster image as the learned cluster image. In addition, the processor 123 may transmit the learned cluster image to the vehicle control device 110. According to an exemplary embodiment, the learned cluster image may include the image of FIG. 3.

Meanwhile, when it is impossible to determine the streaming cluster image corresponding to vehicle information (current vehicle information) and driver information (current driver information) based on the learned cluster image, the processor 123 may determine that the clustering image learned based on the vehicle information (current vehicle information) and driver information (current driver information) does not exist, may generate at least one or more images based on the vehicle information (current vehicle information) and driver information (current driver information), and may determine the streaming cluster image as one of the at least one or more images.

According to an exemplary embodiment, the processor 123 may determine whether the vehicle is currently located in a preset area. When it is determined that the vehicle location is currently located in the preset area, the processor 123 may determine the cluster image corresponding to the preset area as a streaming cluster image and transmit it to the vehicle control device 110. For example, when it is determined that the vehicle is located on a highway, which is the preset area, the processor 123 may determine the image shown in FIG. 6 as the streaming cluster image and transmit the image to the vehicle control device 110.

According to an exemplary embodiment, when it is determined that the current location of the vehicle is not in the preset area, the processor 123 may determine whether the vehicle control device 110 can output an image having a resolution higher than or equal to a reference resolution. For example, the processor 123 may determine whether the processor 116 can output an image having a resolution higher than or equal to the reference resolution based on the processor performance of the vehicle control device.

When it is determined that the vehicle control device 110 cannot output an image having a resolution higher than the reference resolution, the processor 123 may determine a general cluster image as the streaming cluster image and transmit the general cluster image to the vehicle control device 110. For example, when it is determined that the vehicle control device 110 cannot output an image having a resolution higher than or equal to the reference resolution, the processor 123 may determine the image shown in FIG. 9 as the streaming cluster image and transmit the image to the vehicle control device 110.

When it is determined that the vehicle control device 110 can output an image having a resolution higher than or equal to the reference resolution, the processor 123 may determine the driver's age based on the driver information. When it is determined that the driver's age is less than a reference age, the processor 123 may determine a high-definition cluster image for young people as the streaming cluster image and transmit the high-definition cluster image for young people to the vehicle control device 110. As an example, when it is determined that the driver's age is less than the reference age, the processor 123 may determine the image shown in FIG. 7 as the streaming cluster image and transmit the image to the vehicle control device 110.

When it is determined that the driver's age is equal to or greater than the reference age, the processor 123 may determine a general high-definition cluster image as the streaming cluster image and transmit the general high-definition cluster image to the vehicle control device 110. For example, when it is determined that the driver's age is equal to or greater than the reference age, the image shown in FIG. 8 may be determined as the streaming cluster image and transmitted to the vehicle control device 110.

Figure 10:
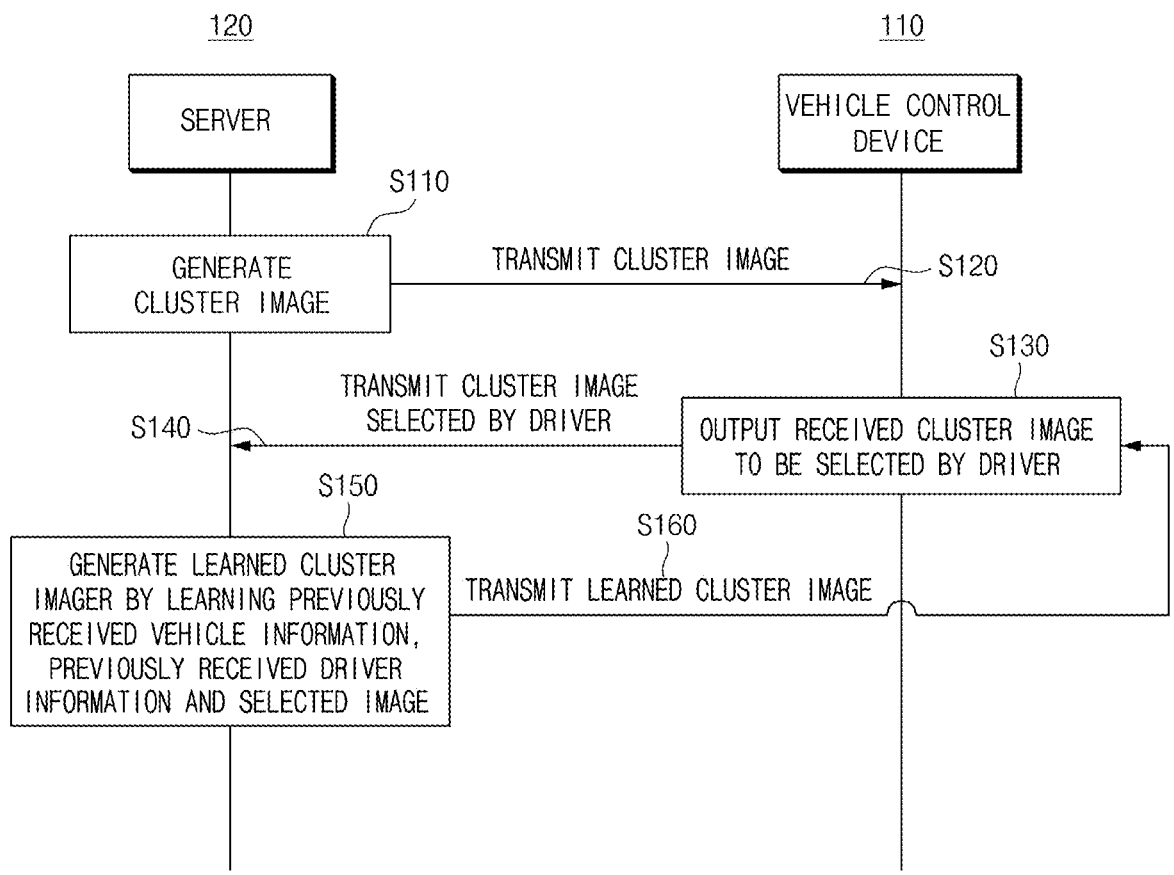
FIGS. 10 to 12 are flowcharts illustrating a vehicle control method according to an exemplary embodiment of the present disclosure.
Figure 11:
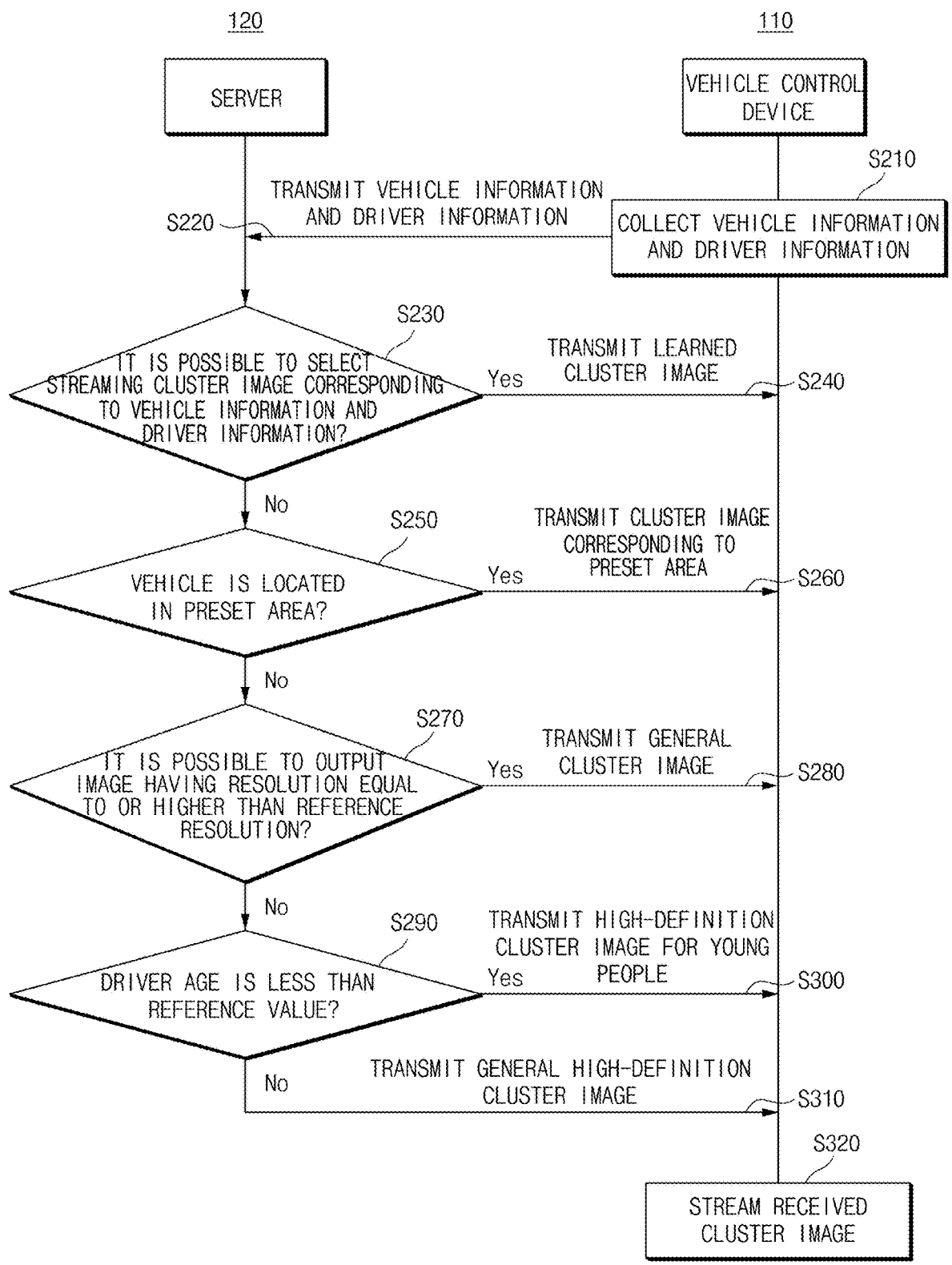
Figure 12:
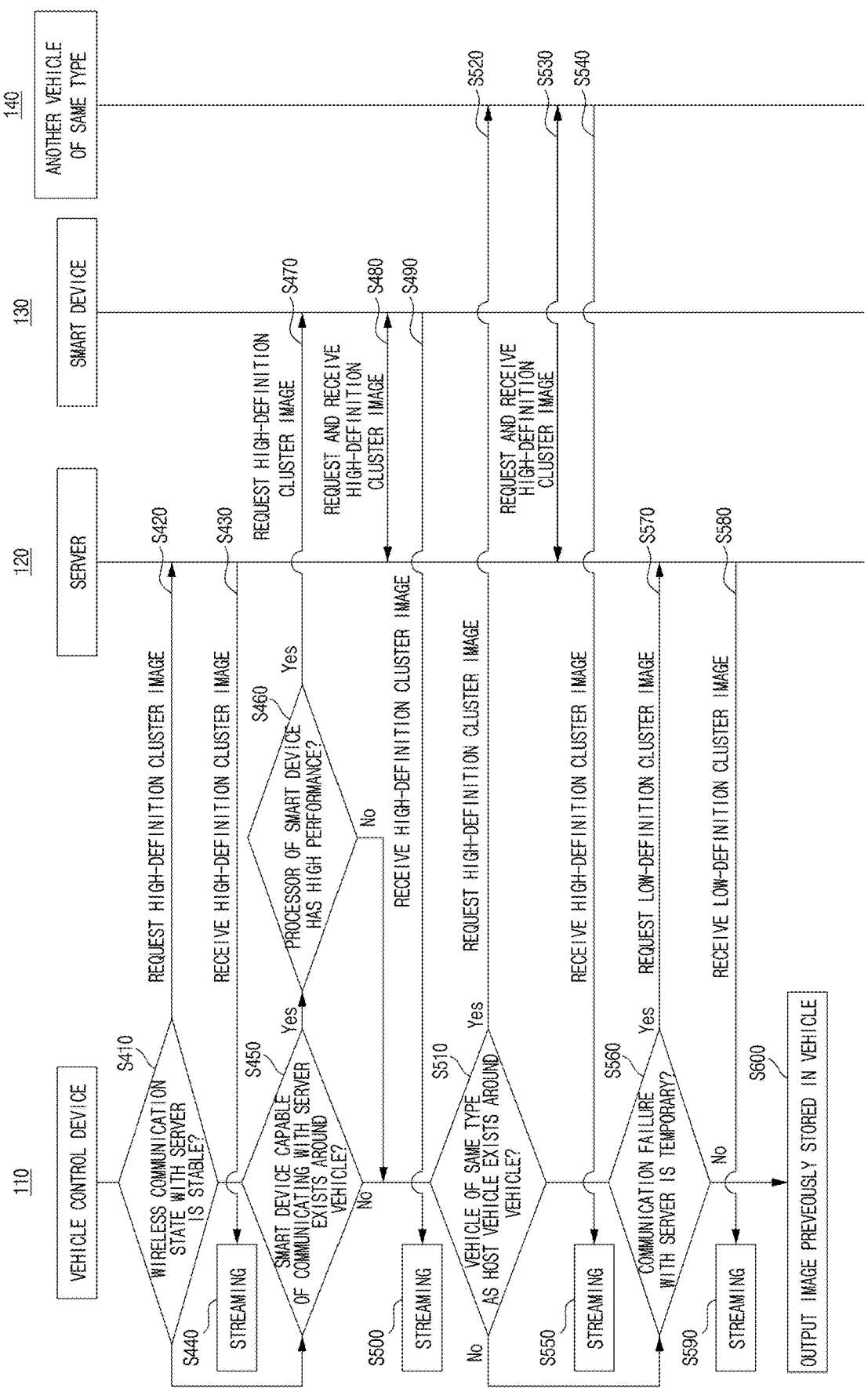

FIGS. 10 to 12 are flowcharts illustrating a vehicle control method according to an exemplary embodiment of the present disclosure.

As shown in FIG. 10, in S110, the server 120 may generate the cluster image based on the vehicle information and driver information (vehicle information for learning and driver information for learning).

In S120, the server 120 may transmit the cluster image generated in S110 to the vehicle control device 110. In S130, the vehicle control device 110 may output the received cluster image to be selected by the user.

In S140, the vehicle control device 110 may transmit the image selected by the driver to the server 120.

When the server 120 receives the image selected by the driver from the vehicle control device 110, in S150, the server 120 may generate a learned cluster image by learning based on the cluster image selected by the driver, the collected vehicle information, and the driver information. Because the cluster image learned in S150 is learned corresponding to the previously received vehicle information and the previously received driver information (vehicle information for learning and driver information for learning), the cluster image may be customized corresponding to the vehicle state and the driver state.

The server 120 may transmit the learned cluster image to the vehicle control device 110 in S160, and then repeat the operations of S130 to S150 so that the cluster image is re-learned to determine a cluster image customized corresponding to the vehicle state and driver state.

According to another embodiment of the present disclosure, as shown in FIG. 11, in S210 and S220, the vehicle control device 110 may collect vehicle information (current vehicle information) and driver information (current driver information) and transmit the vehicle information and driver information to the server 120.

In S230, the server 120 may determine whether a streaming cluster image corresponding to the vehicle information (current vehicle information) and the driver information (current driver information) received from the vehicle control device 110 can be determined. In S230, the processor 123 may determine whether there is a cluster image learned corresponding to the information received from the vehicle control device 110.

When there is a cluster image learned corresponding to the information received from the vehicle control device 110, the server 120 may determine a streaming cluster image corresponding to the information received from the vehicle control device 110 and determine the streaming cluster image as the learned cluster image.

When the streaming cluster image is determined as the learned cluster image, the server 120 may transmit the learned cluster image to the vehicle control device 110 in S240. According to an exemplary embodiment, the learned cluster image may include the image of FIG. 3.

When it is impossible to determine a streaming cluster image corresponding to the vehicle information (current vehicle information) and driver information (current driver information) based on the learned cluster image (N), in S230, the server 120 may determine that the clustering image learned based on the vehicle information (current vehicle information) and driver information (current driver information) does not exist.

In S250, the server 120 may determine whether the vehicle is currently located in a preset area. When it is determined in S250 that the current location of the vehicle is in the preset area (Y), in S260, the server 120 may determine a cluster image corresponding to the preset area as a streaming cluster image (e.g., FIG. 6), and transmit the cluster image to the vehicle control device 110.

When it is determined in S250 that the vehicle is not located in the preset area, in S270, the server 120 may determine whether the vehicle control device 110 can output an image having a resolution higher than or equal to the reference resolution. In S270, the server 120 may determine whether the vehicle control device 110 can output an image having a resolution higher than or equal to the reference resolution based on the processor performance of the vehicle control device.

When it is determined in S270 that the vehicle control device 110 cannot output an image having a resolution higher than the reference resolution (N), in S280, the server 120 may determine a general cluster image as the streaming cluster image (e.g., FIG. 9), and transmit the general cluster image to the vehicle control device 110.

When it is determined in S270 that the vehicle control device 110 can output an image having a resolution higher than the reference resolution (Y), in S290, the server 120 may determine whether the driver's age is less than the reference age, based on the driver information.

When it is determined in S290 that the driver's age is less than the reference age (Y), the server 120 may determine a high-definition cluster image for young people as the streaming cluster image (e.g., FIG. 7), and transmit the high-definition cluster image for young people to the vehicle control device 110, in S300.

When it is determined in S290 that the driver's age is equal to or greater than the reference age (N), in S310, the server 120 may determine a general high-definition cluster image (e.g., FIG. 8) as the streaming cluster image, and transmit the general high-definition cluster image to the vehicle control device 110.

In S320, the vehicle control device 110 may stream the cluster image received from the server 120 in real time.

According to another embodiment of the present disclosure, as shown in FIG. 12, in S410, the vehicle control device 110 may determine whether the wireless communication state with the server 120 is stable. In S410, the vehicle control device 110 may determine whether the streaming cluster image can be received from the server 120.

When it is determined in S410 that the vehicle control device 110 can receive the streaming cluster image from the server 120 (Y), the vehicle control device 110 may request the server 120 to transmit the high-definition cluster image in S420, and when the high-definition cluster image is received from the server 120 in S430, stream the received image in real time in S440.

When it is impossible in S410 that the vehicle control device 110 cannot receive the streaming cluster image because the wireless communication state with the server 120 is not stable due to communication failure and the like (N), in S450, the vehicle control device 110 may determine whether there is a smart device 130 capable of communicating with the server 120 around the host vehicle. The smart device 130 may perform Bluetooth communication with the communication device 112 and, according to an exemplary embodiment, may include a smart phone, a smart pad, a notebook computer, and the like.

When it is determined that there is a smart device capable of communicating with the server 120 around the host vehicle, in S460, the vehicle control device 110 may determine whether the processor of the smart device 130 has high performance. This is to determine whether the smart device 130 can receive the high-definition cluster image from the server 120.

When it is determined in S460 that the processor of the smart device 130 has high performance (Y), the vehicle control device 110 may request the smart device 130 to transmit the high-definition cluster image in S470. In S480, the smart device 130 may request the server 120 to transmit the high-definition cluster image and receive the high-definition cluster from the server 120. The vehicle control device 110 may receive the high-definition cluster image from the smart device 130 in S490 and may stream the received image in real time in S500.

When it is determined in S450 that there is no smart device capable of communicating with the server 120 around the host vehicle (N), or in S460 that the processor of the smart device 130 in S460 is not high performance (N), in S510, the vehicle control device 110 may determine whether another vehicle 140 of the same type as the host vehicle exists around the host vehicle.

When it is determined in S510 that the other vehicle 140 of the same vehicle type as the host vehicle exists around the host vehicle (Y), in S520, the vehicle control device 110 may request transmission of a high-definition cluster image to the other vehicle 140. In S530, the other vehicle 140 may request the high-definition cluster image from the server 120 and receive the high-definition cluster from the server 120. The vehicle control device 110 may receive the high-definition cluster image from the other vehicle 140 in S540 and may stream the received image in real time in S550.

When it is determined in S510 that other vehicles of the same type as the host vehicle do not exist around the host vehicle (N), in S560, the vehicle control device 110 may determine whether the communication failure with the server 120 is temporary.

When it is determined in S560 that the communication failure with the server 120 is temporary (Y), in S570, the vehicle control device 110 may request the server 120 to transmit a streaming cluster image having a resolution less than the reference resolution. The vehicle control device 110 may receive the low-definition cluster image from the smart device 130 in S580 and may stream the received image in real time in S590.

When it is determined in S560 that the communication failure with the server 120 is not temporary (N), in S600, the vehicle control device 110 may output the cluster image (e.g., FIG. 4) previously stored in the vehicle.

Figure 13:
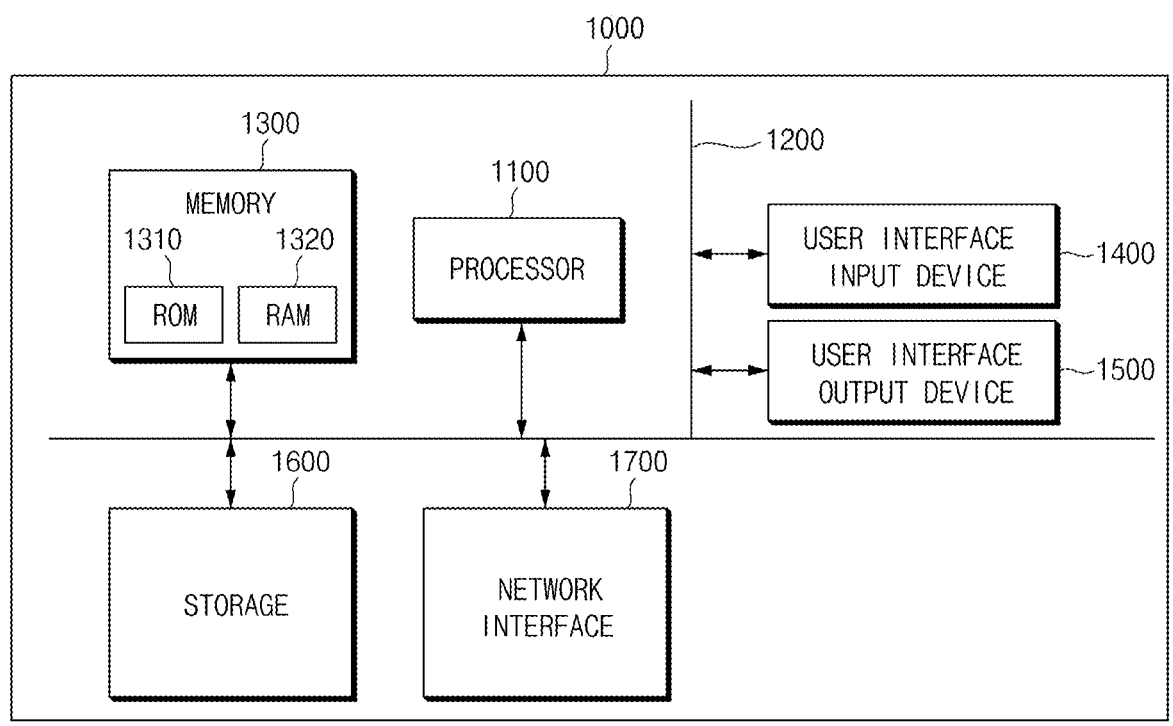
FIG. 13 is a block diagram illustrating a computing system for executing a method according to an exemplary embodiment of the present disclosure.

FIG. 13 is a block diagram illustrating a computing system for executing a method according to an exemplary embodiment of the present disclosure.

Referring to FIG. 13, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the vehicle control system and method of the embodiments, by making it possible to output high-definition images through the digital cluster at low cost, it is possible to save resources of the vehicle control system, reduce the manufacturing cost of the vehicle, and improve user satisfaction.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A system for controlling a vehicle, the system comprising:
  a vehicle control device configured to collect vehicle information and driver information; and
  a server configured to determine a streaming cluster image corresponding to the vehicle information and the driver information based on a learned cluster image;
  wherein the vehicle control device further configured to:

determine whether a smart device capable of communicating with the server exists around a host vehicle when the streaming cluster image is not received due to a communication failure with the server, and receive the streaming cluster image from the smart device when the smart device exists around the host vehicle and is capable of receiving the streaming cluster image from the server.

2. The system of claim 1, wherein the server is further configured to generate the learned cluster image by learning based on a cluster image selected by a driver from cluster images previously transmitted to the vehicle control device, previously received vehicle information, and previously received driver information.

3. The system of claim 1, wherein the server is further configured to determine the streaming cluster image as the learned cluster image when it is possible to determine the streaming cluster image corresponding to the vehicle information and the driver information based on the learned cluster image.

4. The system of claim 1, wherein the server is further configured to:

generate at least one image based on the vehicle information and the driver information, and determine the streaming cluster image as one of the at least one image when it is impossible to determine the streaming cluster image corresponding to the vehicle information and the driver information based on the learned cluster image.

5. The system of claim 1, wherein the vehicle control device is further configured to receive the streaming cluster image through short-range communication from the smart device and output the streaming cluster image to a cluster.

6. The system of claim 1, wherein the vehicle control device is further configured to:

determine whether another vehicle of the same type as the host vehicle exists around the host vehicle when the smart device does not exist, and receive the streaming cluster image through the other vehicle when the other vehicle exists and is capable of receiving the streaming cluster image from the server.

7. The system of claim 6, wherein the vehicle control device is further configured to:

determine whether the communication failure with the server is temporary when the other vehicle does not exist, and request the server to transmit the streaming cluster image having a resolution less than a reference resolution when the communication failure is temporary.

8. The system of claim 7, wherein the vehicle control device is further configured to output a cluster image pre-stored in the vehicle when the communication failure is not temporary.

9. The system of claim 1, wherein the vehicle control device comprises:

a communication device configured to receive the streaming cluster image; and a display device configured to stream the received streaming cluster image in real time or output a pre-stored cluster image.

10. A method of controlling a vehicle, the method comprising:

collecting, by a vehicle control device, vehicle information and driver information; and determining, by a server, a streaming cluster image corresponding to the vehicle information and the driver information based on a learned cluster image;

wherein the vehicle control device further configured to:

determine whether a smart device capable of communicating with the server exists around a host vehicle when the streaming cluster image is not received due to a communication failure with the server, and receive the streaming cluster image from the smart device when the smart device exists around the host vehicle and is capable of receiving the streaming cluster image from the server.

11. The method of claim 10, wherein the server is further configured to generate the learned cluster image by learning based on a cluster image selected by a driver from cluster images previously transmitted to the vehicle control device, previously received vehicle information, and previously received driver information.

12. The method of claim 10, wherein the server is further configured to determine the streaming cluster image as the learned cluster image when it is possible to determine the streaming cluster image corresponding to the vehicle information and the driver information based on the learned cluster image.

13. The method of claim 10, wherein the server is further configured to:

generate at least one image based on the vehicle information and the driver information, and determine the streaming cluster image as one of the at least one image when it is impossible to determine the streaming cluster image corresponding to the vehicle information and the driver information based on the learned cluster image.

14. The method of claim 10, wherein the vehicle control device is further configured to receive the streaming cluster image through short-range communication from the smart device and output the streaming cluster image to a cluster.

15. The method of claim 10, wherein the vehicle control device is further configured to:

determine whether another vehicle of the same type as the host vehicle exists around the host vehicle when the smart device does not exist, and receive the streaming cluster image through the other vehicle when the other vehicle exists and is capable of receiving the streaming cluster image from the server.

16. The method of claim 15, wherein the vehicle control device is further configured to:

determine whether the communication failure with the server is temporary when the other vehicle does not exist, and request the server to transmit the streaming cluster image having a resolution less than a reference resolution when the communication failure is temporary.

17. The method of claim 16, wherein the vehicle control device is further configured to output a cluster image pre-stored in the vehicle when the communication failure is not temporary.

18. The method of claim 10, wherein the vehicle control device comprises:

a communication device configured to receive the streaming cluster image; and a display device configured to stream the received streaming cluster image in real time or output a pre-stored cluster image.

* * * * *